L. E. ARNOLD.
APPARATUS FOR STERILIZING CANNED GOODS.
APPLICATION FILED MAR. 7, 1913.
1,088,957.
Patented Mar. 3, 1914.
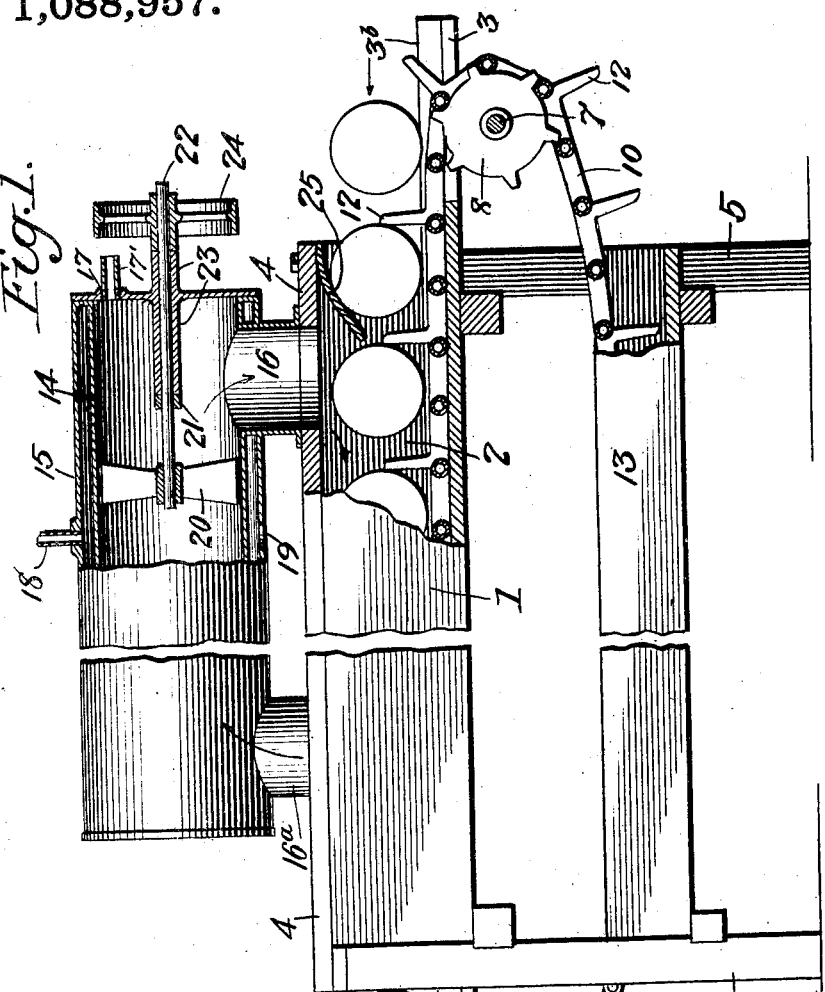
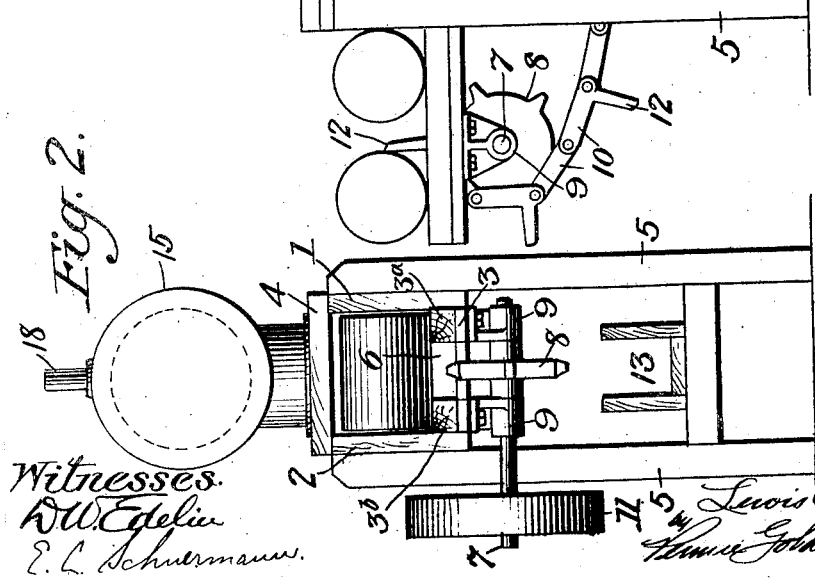

UNITED STATES PATENT OFFICE.

LEWIS E. ARNOLD, OF HONOLULU, TERRITORY OF HAWAII, ASSIGNOR TO HAWAIIAN PINEAPPLE COMPANY, LTD., OF HONOLULU, TERRITORY OF HAWAII.

APPARATUS FOR STERILIZING CANNED GOODS.

1,088,957.      Specification of Letters Patent.      Patented Mar. 3, 1914.

Application filed March 7, 1913. Serial No. 752,756.

*To all whom it may concern:*

Be it known that I, LEWIS E. ARNOLD, a citizen of the United States, residing at Honolulu, in the county of Honolulu, Territory of Hawaii, have invented certain new and useful Improvements in Apparatus for Sterilizing Canned Goods; and I do hereby declare the following to be a full, clear, and exact description of the invention, such as will enable others skilled in the art to which it appertains to make and use the same.

This invention relates to apparatus for sterilizing canned goods, such as fruit, fish and vegetables, and known in the trade as cookers or retorts, and its object is to provide apparatus of this character which shall be simple and inexpensive in construction and efficient in operation.

The invention contemplates, a conduit, means for rolling the cans to be sterilized through the conduit, and means for introducing or for circulating a heating medium such as steam in the conduit so that the cans may become sufficiently heated while being rolled through the conduit and before their discharge from the apparatus to sterilize the canned material.

In carrying out my invention, the conduit may be made of wood, preferably having a rectangular cross section, steam being supplied through a pipe or pipes to the interior of the conduit. An endless chain with attachments is provided for engaging the cans which are fed to one end of the apparatus and for rolling the cans through and discharging them from the opposite end of this conduit. When in order to effect the sterilization the material in the cans to be treated requires a higher temperature in the conduit than that produced by simply admitting steam directly into the conduit, I provide a steam-jacketed drum above and connected to the conduit into which drum the steam is admitted and then superheated by steam under pressure in the surrounding jacket, and means for causing a circulation in the drum and conduit of the steam thus superheated, as will hereinafter more fully appear.

The invention consists in the novel construction and combination of parts as hereinafter described and claimed, reference being had to the accompanying drawings, forming a part of this specification, in which—

Figure 1 represents in side elevation and partly in section one form of apparatus of the kind described embodying my invention. Fig. 2 is an elevation of the discharge end of the same apparatus.

Referring to the drawings, the conduit is composed of the two vertical sides 1 and 2, the bottom 3, and the cover 4, which form a rectangular passageway large enough to permit the cans which are to be treated to be rolled through the same. The conduit is supported by suitable legs 5. The bottom 3 is provided at its center with the longitudinal groove 6 formed by the strips of wood 3ª 3ᵇ adjacent to the sides 1, 2 respectively, as shown. A shaft 7 with a sprocket wheel 8 attached is journaled in the brackets 9 under each end of the apparatus, and an endless chain 10 is passed over these sprocket wheels 8 such that the upper strand of the chain 10 will slide in the groove 6 when the shaft 7 at the discharge end is revolved by a belt applied to the pulley 11 attached to the end of said shaft. This chain is provided with fingers or attachments 12 at short intervals sufficient to permit of the introduction of one can between adjacent fingers. The attachments 12 in the lower strand may slide in the wooden trough 13 supported between the legs 5 under the conduit, as shown.

A drum 14 provided with a steam-jacket 15 is supported above the cover 4 of the conduit by the nozzles 16 16ª. Holes are cut in the cover 4 so that the interior of the conduit and the interior of the drum 14 are connected through said nozzles. Steam is admitted and supplied to the interior of the drum 14 by a pipe 17′ connected to the boss 17. Steam under pressure is admitted to the jacket 15 through the pipe 18, and the jacket is provided with a drain 19. A fan 20 and a collar 21 are secured inside of the drum 14 to the horizontal shaft 22 journaled in the bearing 23 in the center of the head at one end of said drum. A driving pulley 24 is secured to the outer portion of the shaft 22. A flexible flap 25 is secured under each end of the cover 4 to partially at least if not completely prevent the escape of steam from the ends of the conduit and at the same time permit of the passage of the cans under same.

In operation, with the chain 10 moving through the conduit in the direction as indicated by arrows, the cans are fed to one end of the conduit, and the attachments 12 cause the cans to roll on the strips 3ª and 3ᵇ of the bottom 3 until they arrive at and are discharged from the opposite end of the conduit nearest the shaft 7 having the driving pulley 11. The steam admitted to the drum 14 is superheated by the steam under pressure in the jacket 15 which is at a higher temperature. A circulation of the steam thus superheated through the drum 14, nozzle 16, the conduit and nozzle 16ª, as indicated by arrows, is caused by means of the fan 20 revolved by a belt applied to the pulley 24. During the transit of the cans through the conduit, however, they are subjected to the heat of the steam within the conduit sufficiently to sterilize the cans and their contents previous to their discharge from the apparatus.

I claim:

1. Apparatus of the kind described comprising a conduit, means to move containers through the conduit, a steam jacketed drum communicating with the conduit at two points in the length of the former, means to admit steam to the drum, and a revoluble fan within the drum to produce a circulation of the steam through the conduit and the drum, for the purpose described.

2. Apparatus of the kind described comprising a conduit, means for moving containers therethrough, a drum in communication with said conduit, means to admit a heating medium to the circuit formed by said conduit and the drum, means associated with said drum to superheat the heating medium therein, and a revoluble fan within the drum to cause a circulation of the heating medium through the drum and conduit, for the purpose described.

3. Apparatus of the kind described comprising a conduit, means for moving containers therethrough, a drum in communication with the conduit at each end of the former, means to admit steam to the apparatus, means associated with the drum to superheat the steam therein, and means for maintaining a circulation of steam in the drum and conduit.

4. Apparatus of the kind described comprising a conduit, means for moving containers therethrough, a drum communicating with said conduit, means to admit a heating medium to the circuit formed by said drum and conduit, means to superheat the heating medium in the drum, and means to maintain a circulation of the heating medium in the conduit and said drum.

In testimony whereof I affix my signature, in presence of two witnesses.

LEWIS E. ARNOLD.

Witnesses:
J. HOWARD WORRALL,
H. G. GINACA.